(12) United States Patent
Gao et al.

(10) Patent No.: US 8,846,834 B2
(45) Date of Patent: Sep. 30, 2014

(54) CHROMIUM CATALYSTS FOR OLEFIN POLYMERIZATION

(75) Inventors: Xiaoliang Gao, Calgary (CA); Patrick Drew Evans, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 0 days.

(21) Appl. No.: 13/459,378

(22) Filed: Apr. 30, 2012

(65) Prior Publication Data

US 2012/0302707 A1   Nov. 29, 2012

(30) Foreign Application Priority Data

May 25, 2011   (CA) .................................... 2740755

(51) Int. Cl.
```
C08F 4/24       (2006.01)
C08F 110/02     (2006.01)
B01J 21/00      (2006.01)
B01J 23/00      (2006.01)
C08F 10/02      (2006.01)
C08F 210/16     (2006.01)
```

(52) U.S. Cl.
CPC .............. *C08F 10/02* (2013.01); *C08F 210/16* (2013.01)
USPC ............ 526/106; 502/256; 502/319; 526/352

(58) Field of Classification Search
CPC ............. B01J 23/00; B01J 21/00; C08F 4/24; C08F 110/02
USPC ............................ 526/106, 352; 502/256, 319
See application file for complete search history.

(56) References Cited

U.S. PATENT DOCUMENTS

| | | |
|---|---|---|
| 2,825,721 A | 3/1958 | Hogan et al. |
| 3,023,203 A | 2/1962 | Dye |
| 3,248,179 A | 4/1966 | Norwood |
| 3,622,251 A | 11/1971 | Allen |
| 3,704,287 A | 11/1972 | Johnson |
| 4,011,382 A | 3/1977 | Levine et al. |
| 4,077,904 A | 3/1978 | Noshay et al. |
| 4,100,105 A | 7/1978 | Levine et al. |
| 4,115,639 A | 9/1978 | Brown et al. |
| 4,255,542 A * | 3/1981 | Brown et al. .................. 526/88 |
| 4,325,849 A | 4/1982 | Rosen et al. |
| 4,543,399 A | 9/1985 | Jenkins, III et al. |
| 4,548,915 A * | 10/1985 | Goodall et al. ............... 502/104 |
| 4,588,790 A | 5/1986 | Jenkins, III et al. |
| 4,613,484 A | 9/1986 | Ayres et al. |
| 4,719,193 A | 1/1988 | Levine et al. |
| 5,028,670 A | 7/1991 | Chinh et al. |
| 5,317,036 A | 5/1994 | Brady, III et al. |
| 5,352,749 A | 10/1994 | DeChellis et al. |
| 5,405,922 A | 4/1995 | DeChellis et al. |
| 5,436,304 A | 7/1995 | Griffin et al. |
| 5,453,471 A | 9/1995 | Bernier et al. |
| 5,462,999 A | 10/1995 | Griffin et al. |
| 5,616,661 A | 4/1997 | Eisinger et al. |
| 5,668,228 A | 9/1997 | Chinh et al. |
| 5,684,097 A | 11/1997 | Palmroos et al. |
| 6,013,595 A | 1/2000 | Lhost et al. |
| 6,734,131 B2 | 5/2004 | Shih et al. |
| 6,958,375 B2 | 10/2005 | Shih et al. |
| 6,982,304 B2 | 1/2006 | Mure et al. |
| 7,202,313 B2 * | 4/2007 | Jorgensen et al. ............ 526/104 |
| 7,528,090 B2 | 5/2009 | Jacobson et al. |
| 7,906,597 B2 * | 3/2011 | Fouarge ......................... 526/64 |
| 2006/0155081 A1 * | 7/2006 | Jorgensen et al. ............. 526/95 |
| 2006/0160965 A1 | 7/2006 | Goode et al. |
| 2012/0141710 A1 | 6/2012 | Yang et al. |

FOREIGN PATENT DOCUMENTS

| | | |
|---|---|---|
| CA | 2742454 A1 | 12/2012 |
| CN | 1814628 A | 8/2006 |
| EP | 275675 A2 | 7/1988 |
| EP | 628343 A1 | 12/1994 |
| EP | 640625 A2 | 3/1995 |
| WO | WO 00/07714 A1 | 2/2000 |

OTHER PUBLICATIONS

Foreign priority document CA2740755 from Canadian Intellectual Property Office.*
S. Brunauer et al, Adsorption of Gases in Mutimolecular Layers, Journal of the American Chemical Society, 1938, v 60, p. 309-319.
J. B. Peri et al, the Surface Structure of Silica Gel, J. Phys. Chem., 1968, 72 (8), pp. 2926-2933.
A. Noshay et al, Chemical Activation of Silica Supports for Chomocene-based Polyethyene Catalyst, Transition Metal Catalyzed Polymerizations, 1989, Ed. R. Quirk, pp. 396-416.
J. H. Clark et al, Supported Catalysts, Kirk-Othmer Encyclopedia of Chemical Technology, published online Nov. 15, 2002, pp. 1-37.

* cited by examiner

*Primary Examiner* — David W Wu
*Assistant Examiner* — Elizabeth Eng
(74) *Attorney, Agent, or Firm* — Kenneth H Johnson

(57) ABSTRACT

Mineral oil is added to a supported chromium catalyst in amounts which maintain a free flowing particulate material. Chromium catalysts so treated, provide polyethylene in a gas phase ethylene polymerization process with reduced reactor fouling or static.

11 Claims, No Drawings

CHROMIUM CATALYSTS FOR OLEFIN POLYMERIZATION

FIELD OF THE INVENTION

New chromium catalysts and their use in olefin polymerization is presented. The chromium catalysts are formed by adding mineral oil in amounts which do not form a slurry of the catalyst in mineral oil. The catalysts polymerize ethylene with alpha-olefins in a gas phase reactor with low amounts of reactor fouling.

BACKGROUND OF THE INVENTION

The use of chromium based catalysts for the gas phase production of polyethylene is very well established commercial technology. Chromium based catalysts most typically comprise a silyl chromate catalyst or a chromium oxide catalyst on an inert silica support. Such catalysts are introduced into a polymerization reactor either as a dry particulate material or as a slurry in which the solid catalyst particles are suspended in a liquid hydrocarbon diluent, such as for example mineral oil. Although both methods lead to effective polymerization catalysts, the use of a slurry feed system has been found to improve reactor operability. For example, U.S. Pat. No. 7,202,313 demonstrates that feeding a mineral oil slurry of a chromium catalyst to a gas phase reactor reduces the amount of reactor fouling associated with static build up.

U.S. Pat. No. 7,528,090 teaches that an "inert material" can be added to a support in order to modify polymerization kinetics of a supported polymerization catalyst. The inert material is added in amounts that are less than the pore volume of the support material. The preferred polymerization catalyst is a "metallocene" catalyst. It is further preferred that the inert material be added to the support prior to addition of the polymerization catalyst. The patent contemplates but does not exemplify the use of hydrocarbon oil as the inert material; preferred inert materials are polyolefin waxes such as poly-1-butene. Finally, although virtually all polymerization catalysts are contemplated, including Ziegler-Natta and chromium catalysts, the patent is silent as to the effects of mineral oil treatment on a supported chromium catalyst.

We have now found that supported chromium catalysts benefit from the addition of mineral oil in amounts which do not form a slurry or suspension of the supported catalyst in the mineral oil. Such a catalyst can be fed to a reactor using traditional dry catalyst feed equipment and produces polyethylene in a gas phase reactor with low associated fouling. This circumvents the need for capital investment into slurry feed equipment and avoids contaminating the polymer products with significant amounts of mineral oil (which is extractable with hexanes). In addition, slurry feed equipment is sometimes difficult to operate in a consistent manner due to fluctuations in catalyst component concentrations. We note that the performance of Ziegler-Natty catalyst compositions have also benefited from treatment with small amounts of mineral oil (i.e. 5 to 25% by weight of the catalyst) as taught in U.S. Pat. No. 4,548,915.

SUMMARY OF THE INVENTION

Provided is a supported chromium catalyst which produces polyethylene with reduced reactor fouling and/or reactor contents static. The catalyst is prepared by treating a supported chromium catalyst with mineral oil in amounts below those which give rise to a slurried catalyst. Dry feeding the solid catalyst to a gas phase polymerization reactor showed reduced levels of static for reactor contents and un-impacted polymerization activity relative to a catalyst which had not been treated with mineral oil.

Use of a dry, free flowing chromium catalyst circumvents the need for capital investment into slurry feed equipment and does not increase the level of hexane extractables ultimately present in a polymer produced using the catalyst.

Provided is a method for forming a solid polymerization catalyst comprising: adding a mineral oil to a supported chromium catalyst, provided that the mineral oil is added in amounts less than that required to form a slurry of the supported chromium catalyst in mineral oil.

Provided is a method for forming a free flowing, solid polymerization catalyst comprising mineral oil and a supported chromium catalyst.

Provided is a process for making polyethylene by polymerizing ethylene, optionally with one or more alpha olefins, in a gas phase reactor, the process comprising: (a) forming a solid polymerization catalyst by adding mineral oil to a supported chromium catalyst, provided that the mineral oil is added in amounts less than that required to form a slurry of the supported chromium catalyst in the mineral oil; and (b) feeding the solid polymerization catalyst into the gas phase reactor.

In an embodiment of the invention the mineral oil is Kaydol™ oil.

In an embodiment of the invention the mineral oil has a dynamic viscosity of at least 40 centiPoises at 40° C.

In an embodiment of the invention the mineral oil is treated with a scavenger prior to its addition to the supported chromium catalyst.

DETAILED DESCRIPTION

The present invention provides particulate chromium catalysts for olefin (e.g. ethylene) polymerization processes. The catalysts presented in the present invention may be used in gas phase or slurry phase polymerization processes, but gas phase polymerization processes are preferred.

The catalysts are formed by combining a hydrocarbon mineral oil with a chromium catalyst on an inert support to give a solid, preferably free flowing, catalyst material.

In the present invention, the word "dry" as used in terms such as "dry catalyst", "dry powder", "dry feed", "dry catalyst feeder" and the like is meant to connote that a catalyst is present in solid or powder form, in contrast to a catalyst or components which have associated solvents or diluents present and which exist as a slurries, suspensions or solutions.

The chromium catalyst may be a chromium oxide (i.e. $CrO_3$) or any compound convertible to chromium oxide. For compounds convertible to chromium oxide see U.S. Pat. Nos. 2,825,721; 3,023,203; 3,622,251 and 4,011,382. Compounds convertible to chromium oxide include for example, chromic acetyl acetone, chromic chloride, chromic nitrate, chromic acetate, chromic sulfate, ammonium chromate, ammonium dichromate, and other soluble chromium containing salts.

The chromium catalyst may be a silyl chromate catalyst. Silyl chromate catalysts are chromium catalysts which have at least one group of the formula:

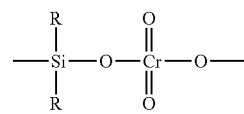

wherein R is independently a hydrocarbon group having from 1 to 14 carbon atoms.

In an embodiment of the invention, the silyl chromate catalyst is a bis(silyl)chromate catalyst which has the formula:

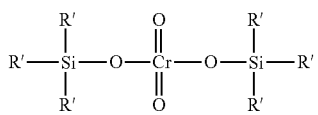

wherein R' is independently a hydrocarbon group having from 1 to 14 carbon atoms.

R or R' can independently be any type of hydrocarbyl group such as an alkyl, alkylaryl, arylalkyl or an aryl radical. Some non-limiting examples of R or R' include methyl, ethyl, propyl, iso-propyl, n-butyl, iso-butyl, n-pentyl, iso-pentyl, t-pentyl, hexyl, 2-methyl-pentyl, heptyl, octyl, 2-ethylhexyl, nonyl, decyl, hendecyl, dodecyl, tridecyl, tetradecyl, benzyl, phenethyl, p-methyl-benzyl, phenyl, tolyl, xylyl, naphthyl, ethylphenyl, methylnaphthyl, dimethylnaphthyl, and the like.

Illustrative of preferred silyl chromates but by no means exhaustive or complete of those that can be employed in the present invention are such compounds as bis-trimethylsilylchromate, bis-triethylsilylchromate, bis-tributylsilylchromate, bis-triisopentylsilylchromate, bis-tri-2-ethylhexylsilylchromate, bis-tridecylsilylchromate, bis-tri(tetradecyl) silylchromate, bis-tribenzylsilylchromate, bis-triphenethylsilylchromate, bis-triphenylsilylchromate, bis-tritolylsilylchromate, bis-trixylylsilylchromate, bis-trinaphthylsilylchromate, bis-triethylphenylsilylchromate, bis-trimethylnaphthylsilylchromate, polydiphenylsilylchromate, polydiethylsilylchromate and the like. Examples of bis-trihydrocarbylsilylchromate catalysts are also disclosed in U.S. Pat. Nos. 3,704,287 and 4,100,105.

The chromium catalyst may also be a mixture of chromium oxide and silyl chromate catalysts.

Finally, the present invention also contemplates the use of chomocene catalysts (see for example U.S. Pat. Nos. 4,077,904 and 4,115,639) and chromyl chloride (e.g. $CrO_2Cl_2$) catalysts.

The chromium catalysts described above, are in the current invention, immobilized on an inert support material, such as for example an inorganic oxide material. Suitable inorganic oxide supports are composed of porous particle materials having a spheroid shape and a size ranging from about 10 micrometers to about 200 micrometers (μm). The particle size distribution can be broad or narrow. The inorganic oxide typically will have a surface area of at least about 100 m²/g, preferably from about 150 to 1,500 m²/g. The pore volume of the inorganic oxide support should be at least 0.2, preferably from about 0.3 to 5.0 ml/g. The surface area and pore volume may be determined by nitrogen adsorption according to B.E.T. techniques, which are well known in the art and are described in the *Journal of the American Chemical Society*, 1938, v 60, pg 309-319. The inorganic oxides may be selected from group 2, 3, 4, 5, 13 and 14 metal oxides generally, such as silica, alumina, silica-alumina, magnesium oxide, zirconia, titania, and mixtures thereof. The use of clay (e.g. montmorillonite) and magnesium chloride as support materials is also contemplated.

When the inorganic oxide is a silica support, it will contain not less than 80% by weight of pure $SiO_2$, with the balance being other oxides such as but not limited to oxides of Zr, Zn, Mg, Ti, Mg and P.

Generally, the inorganic oxide support will contain acidic surface hydroxyl groups that will react with a polymerization catalyst. Prior to use, the inorganic oxide may be dehydrated to remove water and to reduce the concentration of surface hydroxyl groups. For example, the inorganic oxide may be heated at a temperature of at least 200° C. for up to 24 hrs, typically at a temperature of from about 500° C. to about 800° C. for about 2 to 20 hrs, preferably 4 to 10 hrs. The resulting support will be free of adsorbed water and should have a surface hydroxyl content from about 0.1 to 5 mmol/g of support, preferably from 0.5 to 3 mmol/g. The amount of hydroxyl groups in a silica support may be determined according to the method disclosed by J. B. Peri and A. L. Hensley Jr., in *J. Phys. Chem.*, 72 (8), 1968, pg 2926.

Although heating is the preferred means of removing surface hydroxyl groups present in inorganic oxides, such as silica, the hydroxyl groups may also be removed by other removal means, such as chemical means. For example, a desired proportion of OH groups may be reacted with a suitable chemical agent, such as a hydroxyl reactive aluminum compound (e.g. triethylaluminum) or a silane compound. This method of treatment has been disclosed in the literature and two relevant examples are: U.S. Pat. No. 4,719,193 to Levine in 1988 and by Noshay A. and Karol F. J. in *Transition Metal Catalyzed Polymerizations*, Ed. R. Quirk, 396, 1989.

A silica support that is suitable for use in the present invention has a high surface area and is amorphous. By way of example, useful silicas are commercially available under the trademark of Sylopol® 958, 955 and 2408 from Davison Catalysts, a Division of W. R. Grace and Company and ES-70W™ from Ineos Silica.

The amount of chromium catalyst added to the support should be sufficient to obtain between 0.01% and 10%, preferably from 0.1% to 3%, by weight of chromium, calculated as metallic chromium, based on the weight of the support.

The present invention is not limited to any particular procedure for depositing the chromium catalysts on supports. Processes for depositing chromium catalysts on supports are well known in the art (for some non-limiting examples of catalyst supporting methods, see "Supported Catalysts" by James H. Clark and Duncan J. Macquarrie, published online Nov. 15, 2002 in the Kirk-Othmer Encyclopedia of Chemical Technology Copyright © 2001 by John Wiley & Sons, Inc.; for some non-limiting methods for supporting chromium catalysts see U.S. Pat. Nos. 6,982,304; 6,013,595; 6,734,131; 6,958,375; and European Pat. No. 640,625). For example, the chromium catalyst may be added by co-precipitation with the support material or by spray-drying with the support material. The chromium catalyst may also be added by a wet incipient method (i.e. wet impregnation) or similar methods using hydrocarbon solvents or other suitable diluents. Alternatively, the supported chromium catalyst may be obtained by mechanical mixing a solid chromium compound with a support material, followed by heating the mixture. In another variation, the chromium compound may be incorporated into the support during the manufacture thereof so as to obtain a homogeneous dispersion of the metal in the support. In a typical method, a chromium catalyst is deposited on a support from solutions of the chromium catalyst and in such quantities as to provide, after an activation step (if required, see below), the desired levels of chromium on the support. The supported chromium catalysts used in the present invention are generally powdery, free-flowing particulate materials.

The chromium catalyst may require activation prior to use. Activation may involve calcination (as is preferred in the case of chromium oxide) or the addition of a co-catalyst compound (as is preferred in the case of silyl chromate).

Activation by calcination can be accomplished by heating the supported chromium catalyst in steam, dry air or another oxygen containing gas at temperatures up to the sintering temperature of the support. Activation temperatures are typically in the range of 300° C. to 950° C., preferably from 500° C. to 900° C. and activation times are typically from about 10 mins to as about 72 hrs. The chromium catalyst may optionally be reduced after activation using for example, carbon monoxide or a mixture of carbon monoxide and nitrogen.

The supported chromium catalysts may optionally comprise one ore more than one co-catalyst and mixtures thereof. The co-catalyst can be added to the support or the supported chromium catalyst using any well known method. Hence, the co-catalyst and chromium catalyst can be added to the support in any order or simultaneously. Alternatively, the co-catalyst can be added to the supported chromium catalyst in situ. By way of a non-limiting example, the co-catalyst is added as a solution or slurry in hydrocarbon solvent to the supported chromium catalyst which is optionally also in hydrocarbon solvent.

Co-catalysts include compounds represented by formula:

$$M^*R^2_n$$

where M* represents an element of the Group 1, 2 or 13 of the Periodic Table, a tin atom or a zinc atom; and each $R^2$ independently represents a hydrogen atom, a halogen atom (e.g., chlorine fluorine, bromine, iodine and mixtures thereof), an alkyl group (e.g., methyl, ethyl, propyl, pentyl, hexyl, heptyl, octyl, decyl, isopropyl, isobutyl, s-butyl, t-butyl), an alkoxy group (e.g., methyoxy, ethoxy, propoxy, butoxy, isopropoxy), an aryl group (e.g., phenyl, biphenyl, naphthyl), an aryloxy group (e.g., phenoxy), an arylalkyl group (e.g., benzyl, phenylethyl), an arylalkoxy group (benzyloxy), an alkylaryl group (e.g., tolyl, xylyl, cumenyl, mesityl), or an alkylaryloxy group (e.g., methylphenoxy), provided that at least one $R^2$ is selected from a hydrogen atom, an alkyl group having 1 to 24 carbon atoms or an aryl, arylalkyl or alkylaryl group having 6 to 24 carbon atoms; and n is the oxidation number of M*.

Preferred co-catalysts are organoaluminum compounds having the formula:

$$Al^2(X^1)_n(X^2)_{3-n},$$

where $(X^1)$ is a hydrocarbyl having from 1 to about 20 carbon atoms; $(X^2)$ is selected from alkoxide or aryloxide, any one of which having from 1 to about 20 carbon atoms; halide; or hydride; and n is a number from 1 to 3, inclusive. Specific examples of $(X^1)$ moieties include, but are not limited to, ethyl, propyl, n-butyl, sec-butyl, isobutyl, hexyl, and the like. In another aspect, $(X^2)$ may be independently selected from fluoro or chloro. The value of n is not restricted to be an integer, therefore this formula includes sesquihalide compounds or other organoaluminum cluster compounds.

Some non-limiting examples of aluminum co-catalyst compounds that can be used in this invention include, but are not limited to, trialkylaluminum compounds, dialkylaluminum halide compounds, dialkylaluminum alkoxide compounds, dialkylaluminum hydride compounds, and combinations thereof. Specific examples of organoaluminum co-catalyst compounds that are useful in this invention include, but are not limited to: trimethylaluminum (TMA); triethylaluminum (TEA); triisopropylaluminum; diethylaluminum ethoxide; tributylaluminum; disobutylaluminum hydride; triisobutylaluminum; and diethylaluminum chloride.

In the present invention, it is essential that the supported chromium catalyst be combined with mineral oil in an amount which does not form a slurry of the supported chromium catalyst in the mineral oil.

The term "mineral oil" as used herein refers to petroleum hydrocarbons and mixtures of hydrocarbons that may include aliphatic, napthenic, aromatic, and/or paraffinic components that are viscous liquids at 23° C. and preferably have a dynamic viscosity of at least 40 centiPoises (cP) at 40° C. or a kinematic viscosity of a least 40 centistokes (cSt) at 40° C.

There are three basic classes of refined mineral oils including paraffinic oils based on n-alkanes; napthenic oils based on cycloalkanes; and aromatic oil based on aromatic hydrocarbons. Mineral oils are generally a liquid by-product of the distillation of petroleum to produce gasoline and other petroleum based products from crude oil. Hence, mineral oils may be, for example, light, medium or heavy oils coming from the distillation of coal tars or oils obtained during the fractional distillation of petroleum. Mineral oil obtained from petroleum sources (i.e. as a distillate product) will have a paraffinic content, naphthenic content and aromatic content that will depend on the particular type of petroleum used as a source material.

Mineral oils may have a molecular weight of at least 300 amu to 500 amu or more, and a kinematic viscosity at 40° C. of from 40 to 300 centistokes (cSt, note: 1 cSt=1 mm$^2$/s) or greater. In an embodiment of the invention, the mineral oil has a kinematic viscosity of 40 to 200 cSt at 40° C. In an embodiment of the invention, the mineral oil has a kinematic viscosity of 50 to 200 cSt at 40° C.

A mineral oil may be a transparent, colourless oil composed mainly of alkanes (typically 15 to 40 carbons) and cyclic paraffins related to petroleum jelly.

Mineral oils may be oils which are hydrocarbon mixtures distilling from about 225° C. to about 400° C. Typical examples of such mineral oils are the ONDINA® 15 to 68 oils sold by Shell or their equivalents.

In the present invention, the term "mineral oil" includes synthetic oils and other commercial oils such as paraffin oils sold under such names as KAYDOL™ (or White Mineral Oil), ISOPAR™, STRUKTOL™, SUNPAR™ oils, PARAPOL™ oils, and other synthetic oils, refined naphthenic hydrocarbons, and refined paraffins known in the art.

Preferably the mineral oil is substantially free of impurities which may negatively affect the chromium catalyst activity or performance. Hence, it is preferably to use relatively pure mineral oil (i.e. greater than 95 percent pure or greater than 99 percent pure). Suitable mineral oils include Kaydol, Hydrobrite 550™, and Hydrobridte 1000™ available from Crompton Chemical Corporation.

In an embodiment of the invention, the mineral oil is a hydrocarbon mineral oil which is viscous and comprises primarily aliphatic hydrocarbons oils.

In an embodiment of the invention, the mineral oil is non volatile at ambient conditions (i.e. at least 80% by weight of the mineral oil should have an initial boiling point of at least 300° C. at ambient (i.e. atmospheric) pressure).

In an embodiment of the invention, the mineral oil is mainly paraffinic/naphthenic in nature (i.e. less than 30% by weight of the mineral oil is aromatic in nature).

In an embodiment of the invention, the mineral oil is selected from Kaydol, Shellflex 371 and Tufflo 6000 series paraffinic/naphthenic mineral oils.

In an embodiment of the invention, the mineral oil has a dynamic viscosity at 40° C. of at least 40 centiPoise (cP). In an embodiment of the invention, the mineral oil has a dynamic viscosity at 40° C. of at least 45 centiPoise (cP). In an embodiment of the invention, the mineral oil has a dynamic viscosity at 40° C. of at least 50 centiPoise (cP).

In embodiments of the invention, the mineral oil has a dynamic viscosity at 40° C. of from 30 to 90 centiPoise (cP), or from 40 to 80 cP, or from 45 to 80 cP, or from 40 to 70 cP, or from 50 to 90 cP, or from 50 to 80 cP, or from 50 to 70 cP.

In an embodiment of the invention, the mineral oil is Kaydol oil.

The mineral oil used in the present invention to treat the supported chromium catalyst may also be a mixture or blend of two or more mineral oils in various concentrations.

Although mineral oils are preferred, the use of silicon oils is also contemplated for use with the current invention, provided the silicon oil is inert toward reaction with the chromium catalysts.

Preferred mineral and silicon oils useful in the present invention are those that exclude moieties that are reactive with chromium catalysts, examples of which include hydroxyl and carboxyl groups.

The methods for adding a mineral oil to the chromium catalyst are not limited but it is essential that the resulting catalyst be in the form of a solid powder, preferably a free flowing powder, and which is not a slurry of solid catalyst in mineral oil. Hence, the amount of mineral oil added to a supported chromium catalyst must be less than the amount required to give a slurry of the supported chromium catalyst in mineral oil. Put another way, the upper limit of mineral oil added to the supported chromium catalyst must be below an amount whereby the supported chromium catalyst is no longer a solid, preferably a free flowing solid or powder. Above this amount the supported chromium catalyst may become sticky or tacky which is not preferred. Sticky or tacky particulate catalysts are not easily fed to a polymerization reactor as a dry feed without carrier diluents and/or solvents.

In an embodiment of the invention, the amount of mineral oil added to a supported chromium catalyst is just sufficient to fill the pores of the support material or is somewhat less than the amount required to entirely fill the pores, but is not greater than the amount required to fill the pores. Methods to determine the pore volume of a support are well known by persons skilled in the art (pore volume can be determined by nitrogen adsorption according to B.E.T. techniques, described in the *Journal of the American Chemical Society*, 1939, v 60, pg 209-319).

The amount of mineral oil that can be added to a chromium catalyst without forming a slurry can be determined by experiment and will depend on a number of factors such as the type of chromium catalyst used, and especially the type and physical properties of the support on which the chromium catalyst is immobilized.

In an embodiment of the present invention, the support is a silica support.

In an embodiment of the invention, a supported chromium catalyst will comprise from 1 to 45 weight percent of mineral oil based on the entire weight of the supported chromium catalyst.

In an embodiment of the invention, a supported chromium catalyst will comprise from 5 to 45 weight percent of mineral oil based on the entire weight of the supported chromium catalyst.

In an embodiment of the invention, a supported chromium catalyst will comprise from 5 to 40 weight percent of mineral oil based on the entire weight of the supported chromium catalyst.

In an embodiment of the invention, a supported chromium catalyst will comprise from 10 to 40 weight percent of mineral oil based on the entire weight of the supported chromium catalyst.

In an embodiment of the invention, a supported chromium catalyst will comprise from 15 to 40 weight percent of mineral oil based on the entire weight of the supported chromium catalyst.

In an embodiment of the invention, a supported chromium catalyst will comprise from 20 to 40 weight percent of mineral oil based on the entire weight of the supported chromium catalyst.

In an embodiment of the invention, a supported chromium catalyst will comprise from 25 to 40 weight percent of mineral oil based on the entire weight of the supported chromium catalyst.

In an embodiment of the invention, a supported chromium catalyst will comprise from 30 to 40 weight percent of mineral oil based on the entire weight of the supported chromium catalyst.

In further embodiments of the invention, a supported chromium catalyst will comprise from 1 to 35 weight percent, or from 5 to 35 weight percent or from 10 to 35 weight percent, or from 15 to 35 weight percent, or from 20 to 35 weight percent, or from 25 to 35 weight percent, or from 30 to 35 weight percent of mineral oil based on the entire weight of the supported chromium catalyst.

As stated above, the method used for adding a mineral oil to the supported chromium catalyst is not limited in the present invention, but one convenient way to combine a mineral oil with a supported chromium catalyst is to combine them in suitable hydrocarbon diluents. Without wishing to be bound by theory the use of hydrocarbon diluent(s) may assist the mineral oil in penetrating the pores of the catalyst support. As used herein, the term "hydrocarbon diluent(s)" is meant to include any suitable hydrocarbon diluents other than mineral oils (or silicon oils). For example, n-pentane, isopentane, n-hexane, benzene, toluene, xylene, cyclohexane, isobutane and the like can be used as a hydrocarbon diluent. One or more hydrocarbon diluents may be used. A mixture of hydrocarbon diluent(s) and mineral oil may be added to a dry catalyst powder (i.e. the supported chromium catalyst) or to a catalyst powder slurried in a suitable diluent. Stirring or other agitation may be used. Alternatively, a dry catalyst (i.e. the supported chromium catalyst) powder may be added to a mineral oil or a mineral oil/hydrocarbon diluent mixture, either directly or as a slurry in suitable hydrocarbon diluents (s). When the supported chromium catalyst and the mineral oil are combined in the presence of hydrocarbon diluents(s), the hydrocarbon diluents(s) must be subsequently removed to give the supported chromium catalyst in solid or powder form. Diluent(s) can be removed by using one or more steps selected from washing, filtration and evaporation steps, but the use of exclusively evaporation steps is preferred so as not to remove the mineral oil component from the supported chromium catalyst. Preferably, the supported chromium catalyst containing mineral oil is obtained as free flowing solid. Mineral oil may also be added directly to a dry catalyst powder (i.e. the supported chromium catalyst) or vice versa which may optionally be washed with hydrocarbon diluent (s). The oil may also be sprayed onto the dry catalyst powder or the mineral oil may be stirred/tumbled with the dry catalyst powder.

It is preferable to take a pre-made supported chromium catalyst and treat it with mineral oil either directly or in the presence of hydrocarbon diluent(s), although the addition of mineral oil to a support material before the chromium catalyst (or optional co-catalyst) is added is also contemplated and may be useful in some embodiments of the invention. For example, a mineral oil solution or suspension in a suitable hydrocarbon may be added to a supported chromium catalyst followed by the removal of hydrocarbon using well known methods. Such a technique would be suitable for plant scale process and may employ one or more mixing tanks, and one or more solvent/diluent removal steps.

In an embodiment of the invention, the mineral oil is added to a pre-made supported chromium catalyst either directly or in the presence of hydrocarbon diluents.

In an embodiment of the invention, a blend of a mineral oil and hydrocarbon diluent selected from the group consisting of $C_1$ to $C_{10}$ alkanes, $C_6$ to $C_{20}$ aromatic hydrocarbons, $C_7$ to $C_{21}$ alkyl-substituted hydrocarbons, and mixtures thereof is added to a supported chromium catalyst followed by removal of the hydrocarbon diluent. In another embodiment, a mineral oil and hydrocarbon diluent selected from the group consisting of $C_1$ to $C_{10}$ alkanes, $C_6$ to $C_{20}$ aromatic hydrocarbons, $C_7$ to $C_{21}$ alkyl-substituted hydrocarbons, and mixtures thereof is added to a supported chromium catalyst followed by removal of the hydrocarbon diluent.

When the mineral oil is blended with a suitable hydrocarbon diluent, the diluents-mineral oil mixture may comprise from 1 to 99 wt %, by weight of mineral oil, preferably at least 5 or at least 10 or at least 15 wt % of mineral oil.

Removal of hydrocarbon diluents by evaporation/drying is well known, but preferably the evaporation is carried out under conditions which do not adversely affect the performance of the chromium catalyst. Hence evaporation or drying is carried out under temperatures which do not cause agglomeration of sticking of the catalyst particles together. Removal of hydrocarbon diluents can be carried out under ambient pressures or reduced pressures. Removal of hydrocarbon diluents can be achieved under ambient temperatures or elevated temperatures, provided that elevated temperatures do not lead to catalyst deactivation or catalyst particle agglomeration/sticking. Hydrocarbon diluents may in some circumstances (i.e. for low boiling hydrocarbons) be "blown off" using an inert gas. The time required to remove the hydrocarbon diluents(s) is not specifically defined, but will be sufficient to provide a supported chromium catalyst in solid form, preferably as free flowing particulate solid or powder.

In an embodiment of the invention, the mineral oil and/or hydrocarbon diluent(s) is further treated with a scavenger prior to combination with a chromium catalyst.

The scavenger can be any substance which consumes or deactivates trace impurities or poisons and which adversely affect the activity of the chromium catalyst. Suitable scavengers are well known and include organometallic compounds, such as but not limited to organoaluminum compounds having the formula:

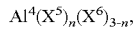
$$Al^4(X^5)_n(X^6)_{3-n},$$

where $(X^5)$ is a hydrocarbyl having from 1 to about 20 carbon atoms; $(X^6)$ is selected from alkoxide or aryloxide, any one of which having from 1 to about 20 carbon atoms; halide; or hydride; and n is a number from 1 to 3, inclusive; or alkylaluminoxanes having the formula:

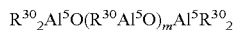
$$R^{30}{}_2Al^5O(R^{30}Al^5O)_mAl^5R^{30}{}_2$$

wherein each $R^{30}$ is independently selected from the group consisting of $C_{1-20}$ hydrocarbyl radicals and m is from 3 to 50. Preferred scavengers are trialkylaluminum compounds and include triisobutylaluminum, and triethylaluminum.

The chromium catalyst of the present invention is added to a polymerization zone using a dry catalyst feeder. Dry catalyst feeders are well known to persons skilled in the art and generally include a loading tube/chamber which is connected to a polymerization reactor and which under positive gas pressure delivers a catalyst "plug" to the reactor zone. The catalyst feeder, typically made of metal may comprise a chamber having a mesh or screen and a metal plate with holes in it and which leads to tubing which carries the dry catalyst into the reactor. The operation is often carried out under a nitrogen atmosphere and the dry catalyst is transferred to the reactor under positive nitrogen pressure. For methods of feeding a dry catalyst to a polymerization reactor as a free flowing powder see European Pat. Nos. 628,343; 275,675, and WO 00/07714 which are incorporated herein by reference.

The supported chromium catalyst of the present invention may be used in a slurry phase or a gas phase polymerization process. Polymerization in a gas phase reactor is preferred.

In an embodiment of the invention, a solid, mineral oil treated supported chromium catalyst used in a gas phase polymerization process produces polyethylene with reduced levels of static in a gas phase reactor.

In an embodiment of the invention, a solid, mineral oil treated supported chromium catalyst used in a gas phase polymerization process produces polyethylene with reduced levels of fouling in a gas phase reactor.

In an embodiment of the invention, a solid, mineral oil treated supported chromium catalyst used in a gas phase polymerization process produces polyethylene with improved operability of a gas phase reactor.

In an embodiment of the invention, a solid, mineral oil treated supported chromium catalyst used in a gas phase polymerization process produces polyethylene with reduced levels of powdered fines in a gas phase reactor.

Detailed descriptions of slurry polymerization processes are widely reported in the patent literature. For example, particle form polymerization, or a slurry process where the temperature is kept below the temperature at which the polymer goes into solution is described in U.S. Pat. No. 3,248,179. Other slurry processes include those employing a loop reactor and those utilizing a plurality of stirred reactors in series, parallel, or combinations thereof. Non-limiting examples of slurry processes include continuous loop or stirred tank processes. Further examples of slurry processes are described in U.S. Pat. No. 4,613,484.

Slurry processes are conducted in the presence of a hydrocarbon diluent such as an alkane (including isoalkanes), an aromatic or a cycloalkane. The diluent may also be the alpha olefin comonomer used in copolymerizations. Alkane diluents include propane, butanes, (i.e. normal butane and/or isobutane), pentanes, hexanes, heptanes and octanes. The monomers may be soluble in (or miscible with) the diluent, but the polymer is not (under polymerization conditions). The polymerization temperature is preferably from about 5° C. to about 200° C., most preferably less than about 120° C. typically from about 10° C. to 100° C. The reaction temperature is selected so that the ethylene copolymer is produced in the form of solid particles. The reaction pressure is influenced by the choice of diluent and reaction temperature. For example, pressures may range from 15 to 45 atmospheres (about 220 to 660 psi or about 1500 to about 4600 kPa) when isobutane is used as diluent (see, for example, U.S. Pat. No. 4,325,849) to approximately twice that (i.e. from 30 to 90 atmospheres—about 440 to 1300 psi or about 3000-9100 kPa) when propane is used (see U.S. Pat. No. 5,684,097). The pressure in a slurry process must be kept sufficiently high to keep at least part of the ethylene monomer in the liquid phase. The reaction typically takes place in a jacketed closed loop reactor having an internal stirrer (e.g. an impeller) and at least one settling leg. Catalyst, monomers and diluents are fed to the reactor as liquids or suspensions. The slurry circulates through the reactor and the jacket is used to control the temperature of the reactor. Through a series of let down valves the slurry enters a settling leg and then is let down in pressure to flash the diluent and unreacted monomers and recover the polymer generally in a cyclone. The diluent and unreacted monomers are recovered and recycled back to the reactor.

A gas phase process is commonly carried out in a fluidized bed reactor. Such gas phase processes are widely described in the literature (see for example U.S. Pat. Nos. 4,543,399, 4,588,790, 5,028,670, 5,317,036, 5,352, 749, 5,405,922, 5,436,304, 5,453,471, 5,462,999, 5,616,661 and 5,668,228). In general, a fluidized bed gas phase polymerization reactor employs a "bed" of polymer and catalyst which is fluidized by a flow of monomer, comonomer and other optional components which are at least partially gaseous. Heat is generated by the enthalpy of polymerization of the monomer (and comonomers) flowing through the bed. Un-reacted monomer, comonomer and other optional gaseous components exit the fluidized bed and are contacted with a cooling system to remove this heat. The cooled gas stream, including monomer, comonomer and optional other components (such as condensable liquids), is then re-circulated through the polymerization zone, together with "make-up" monomer (and comonomer) to replace that which was polymerized on the previous pass. Simultaneously, polymer product is withdrawn from the reactor. As will be appreciated by those skilled in the art, the "fluidized" nature of the polymerization bed helps to evenly distribute/mix the heat of reaction and thereby minimize the formation of localized temperature gradients.

The reactor pressure in a gas phase process may vary from about atmospheric to about 600 Psig. In a more specific embodiment, the pressure can range from about 100 psig (690 kPa) to about 500 psig (3448 kPa). In another more specific embodiment, the pressure can range from about 200 psig (1379 kPa) to about 400 psig (2759 kPa). In yet another more specific embodiment, the pressure can range from about 250 psig (1724 kPa) to about 350 psig (2414 kPa).

The reactor temperature in a gas phase process may vary according to the heat of polymerization as described above. In a specific embodiment, the reactor temperature can be from about 30° C. to about 130° C. In another specific embodiment, the reactor temperature can be from about 60° C. to about 120° C. In yet another specific embodiment, the reactor temperature can be from about 70° C. to about 110° C. In still yet another specific embodiment, the temperature of a gas phase process can be from about 70° C. to about 100° C.

The fluidized bed process described above is well adapted for the preparation of polyethylene homopolymer from ethylene alone, but other monomers (i.e. comonomers) may also be employed in order to give polyethylene copolymer. Comonomers include $C_{3-12}$ alpha olefins which are unsubstituted or substituted by up to two $C_{1-6}$ alkyl radicals, $C_{8-12}$ vinyl aromatic monomers which are unsubstituted or substituted by up to two substituents selected from the group consisting of $C_{1-4}$ alkyl radicals, $C_{4-12}$ straight chained or cyclic diolefins which are unsubstituted or substituted by a $C_{1-4}$ alkyl radical. Illustrative non-limiting examples of alpha-olefins include one or more of propylene, 1-butene, 1-pentene, 1-hexene, 1-octene, and 1-decene, styrene, alpha methyl styrene, p-t-butyl styrene, and the constrained-ring cyclic olefins such as cyclobutene, cyclopentene, dicyclopentadiene norbornene, alkyl-substituted norbornenes, alkenyl-substituted norbornenes and the like (e.g. 5-methylene-2-norbornene and 5-ethylidene-2-norbornene, bicyclo-(2,2,1)-hepta-2,5-diene).

In one embodiment, the invention is directed toward a polymerization process involving the polymerization of ethylene optionally with one or more of the comonomer(s) which can be one or more linear or branched comonomer(s) having from 3 to 30 carbon atoms, preferably 3-12 carbon atoms, more preferably 4 to 8 carbon atoms. The process is particularly well suited to copolymerization reactions involving the polymerization of ethylene in combination with one or more of comonomers, for example alpha-olefin comonomers such as propylene, 1-butene, 1-pentene, 4-methyl-1-pentene, 1-hexene, 1-octene, 1-decene, styrene and cyclic and polycyclic olefins such as cyclopentene, norbornene and cyclohexene or a combination thereof. Other comonomers for use with ethylene can include polar vinyl monomers, diolefins such as 1,3-butadiene, 1,4-pentadiene, 1,4-hexadiene, 1,5-hexadiene, norbornadiene, and other unsaturated monomers including acetylene and aldehyde monomers. Higher alpha-olefins and polyenes or macromers can be used also. Preferably the comonomer is an alpha-olefin having from 3 to 15 carbon atoms, preferably 4 to 12 carbon atoms and most preferably 4 to 10 carbon atoms.

In an embodiment of the invention, ethylene comprises at least 75 wt % of the total weight of monomer (i.e. ethylene) and comonomer (i.e. alpha olefin) that is fed to a polymerization reactor.

In an embodiment of the invention, ethylene comprises at least 85 wt % of the total weight of monomer (i.e. ethylene) and comonomer (i.e. alpha olefin) that is fed to a polymerization reactor.

In another embodiment ethylene is polymerized with at least two different comonomers to form a terpolymer and the like, the preferred comonomers are a combination of monomers, alpha-olefin monomers having 3 to 10 carbon atoms, more preferably 3 to 8 carbon atoms, optionally with at least one diene monomer. The preferred terpolymers include the combinations such as ethylene/butene-1/hexene-1, ethylene/propylene/butene-1, ethylene/propylene/hexene-1, ethylene/propylene/norbornadiene, ethylene/propylene/1,4-hexadiene and the like.

Optionally, scavengers are added to the polymerization process. The present invention can be carried out in the presence of any suitable scavenger or scavengers. Scavengers are well known in the art.

In an embodiment of the invention, scavengers are organoaluminum compounds having the formula: $Al^3(X^3)_n(X^4)_{3-n}$, where $(X^3)$ is a hydrocarbyl having from 1 to about 20 carbon atoms; $(X^4)$ is selected from alkoxide or aryloxide, any one of which having from 1 to about 20 carbon atoms; halide; or hydride; and n is a number from 1 to 3, inclusive; or alkylaluminoxanes having the formula:

$$R^3{}_2Al^1O(R^3Al^1O)_mAl^1R^3{}_2$$

wherein each $R^3$ is independently selected from the group consisting of $C_{1-20}$ hydrocarbyl radicals and m is from 3 to 50. Some non-limiting preferred scavengers useful in the current invention include triisobutylaluminum, triethylaluminum, trimethylaluminum or other trialkylaluminum compounds.

The scavenger may be used in any suitable amount but by way of non-limiting examples only, can be present in an amount to provide a molar ratio of Al:M (where M is the metal of the organometallic compound) of from about 20 to about 2000, or from about 50 to about 1000, or from about 100 to about 500. Generally the scavenger is added to the reactor prior to the catalyst and in the absence of additional poisons and over time declines to 0, or is added continuously.

Optionally, the scavengers may be independently supported. For example, an inorganic oxide that has been treated with an organoaluminum compound or alkylaluminoxane may be added to the polymerization reactor. The method of addition of the organoaluminum or alkylaluminoxane compounds to the support is not specifically defined and is carried out by procedures well known in the art.

EXAMPLES

Catalyst Preparation

Example 1 (Comparative)

Untreated Chromium Catalyst: Sylopol 955® silica, purchased from Grace Davison, was calcined by fluidizing with air at 200° C. for 2 hours and then under a flow of nitrogen at 600° C. for 6 hours. 60 g of such treated silica, 1.94 g of silyl chromate and 480 mL of purified hexanes were added under a nitrogen atmosphere into a 1 L-three neck, round bottom flask equipped with an overhead stirrer. The flask was covered with aluminum foil and the slurry was stirred at 45° C. for 2 hours. The aluminum foil was removed. 9.37 g of a 25 wt % diethyl aluminum ethoxide in hexane solution was added over 5 minutes to the flask. The slurry was further stirred at 60° C. for 2.5 hours. The solvent was removed by vacuum until 500 microns was achieved, resulting in a free flowing catalyst powder.

Example 2 (Inventive)

Mineral Oil Treated Chromium Catalyst: To a vial containing 2 grams of the solid chromium catalyst prepared as above was added a pentane solution of Kaydol™ mineral oil and a triisobutylaluminum scavenger. The pentane solution contained 10 mL of pentane, 1 g of Kaydol mineral oil and a drop of triisobutylaluminum. Addition of the pentane solution gave rise to a slurry of the solid chromium catalyst. Next, the pentane was removed under vacuum to give a free flowing solid chromium catalyst. The mineral oil was added in an amount below that which gives a slurry of the catalyst in mineral oil after pentane removal. In the present example, Kaydol mineral oil makes up 33.2% by weight of the finished chromium catalyst.

Ethylene/1-Hexene Polymerization

General Conditions: A 2 L stirred tank batch reactor was heated at 100° C. for 1 hour and thoroughly purged with nitrogen. The reactor was then cooled to 90° C. The stir rate for the reactor at this point was 10 hertz. A scavenger (triethylaluminum supported on silica) and a chromium catalyst (prepared as above in Example 1 or 2) were loaded into a catalyst inject tube in an inert atmosphere glove box. The catalyst injection tube was attached to the reactor, and the reactor was purged once with ethylene and once with nitrogen. The reactor was kept at high pressure during each of the ethylene and nitrogen purging steps (2-5 minutes) to ensure a proper mixing of the reactor atmosphere. After the nitrogen was purged, the reactor pressure was brought down to about 2 psia. Next, 4 milliliters of 1-hexene were added to bring the pressure up to about 6 psia. Following this, hydrogen was added to the reactor. At this point ethylene was passed through the catalyst injections tube pushing the chromium catalyst and scavenger into the reactor. The reactor stir rate was increased to 25 hertz. The run was continued for 60 minutes, before the ethylene flow was stopped. Cooling water was turned on and the ethylene was slowly vented from the reactor. The reactor was then purged with nitrogen. The reactor was then opened so that the reactor contents, the reactor appearance and the polymer could be observed. The polymer was removed and then weighed.

Example 3 (Comparative)

Polymerization reactor conditions: temperature, 90° C.; ethylene pressure, 200 psia; hydrogen pressure, 10 psia; 1-hexene conditions, 4 ml (4 psia) initial injection to give a ratio C6/C2 of 4 weight %; run time, 60 min; catalyst loading, 250 mg; scavenger loading (triethylaluminum supported on silica), 150 mg; reactor volume, 2 L. Three ethylene/1-hexene polymerization runs were carried out using the chromium catalyst prepared in Example 1 (see runs 1, 2 and 3 in Table 1). When the reactor was opened after 1 and 2 hour polymerization runs (see Table 1), a small amount of polymer build up was observed on the reactor walls, the agitator shaft and the agitator blades

Example 4 (Inventive)

Polymerization reactor conditions: temperature, 90° C.; ethylene pressure, 200 psia; hydrogen pressure, 10 psia; 1-hexene conditions, 4 ml (4 psia) initial injection to give a ratio C6/C2 of 4 weight %; run time, 60 min; catalyst loading, 375 mg; scavenger loading (triethylaluminum supported on silica), 150 mg; reactor volume, 2 L. Three ethylene/1-hexene polymerization runs were carried out using the free flowing chromium catalyst prepared in Example 2 (see runs 4, 5 and 6 in Table 1). When the reactor was opened after 1 and 2 hour polymerization runs (see Table 1), there was virtually no polymer build up observed on the reactor walls, the agitator shaft or the agitator blades.

TABLE 1

| Chromium Catalyst | Polymerization Run No. | Length of Run (hours) | Productivity (g polymer/g catalyst) | Static or Fouling |
|---|---|---|---|---|
| Untreated | 1 | 1 | 250 | Low |
| Untreated | 2 | 1 | 241 | Low |
| Untreated | 3 | 2 | 310 | Low |
| Oil Treated | 4 | 1 | 238 | None |
| Oil Treated | 5 | 1 | 241 | None |
| Oil Treated | 6 | 2 | 383 | None |

What is claimed is:

1. A process for making polyethylene by polymerizing ethylene, optionally with one or more alpha olefins, in a gas phase reactor, the process comprising:
   a) forming a solid polymerization catalyst by adding mineral oil to a supported chromium catalyst, provided that the mineral oil is added in amounts less than that required to form a slurry of the supported chromium catalyst in the mineral oil; and
   b) feeding the solid polymerization catalyst into the gas phase reactor using a dry catalyst feeder;
   wherein the supported chromium catalyst is supported on silica.

2. The process of claim 1 wherein the mineral oil is added in an amount which provides a solid supported chromium catalyst comprising from 5 to 40% of mineral oil by weight.

3. The process of claim 1 which is a fluidized bed gas phase polymerization process.

4. The process of claim 1 wherein ethylene is polymerized with an alpha olefin selected from the group consisting of propene, 1-butene, 1-hexene and 1-octene.

5. The process of claim 1 wherein the chromium catalyst is selected from the group consisting of chromium oxide and silylchromate catalysts.

6. The process of claim 1 wherein the chromium catalyst is a bis(silyl)chromate catalyst which has the formula:

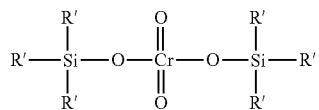

wherein R' is independently a hydrocarbon group having from 1 to 14 carbon atoms.

7. The process of claim 1 wherein the mineral oil is Kaydol oil.

8. The process of claim 1 wherein the mineral oil is added to the supported chromium catalyst in the presence of an inert hydrocarbon, the inert hydrocarbon being subsequently removed by evaporation.

9. The process of claim 1 wherein the mineral oil is treated with a scavenger prior to addition to the supported chromium catalyst.

10. The process of claim 1 wherein the mineral oil is added to a pre-made supported chromium catalyst.

11. The process of claim 1 wherein the mineral oil has a dynamic viscosity of at least 40 centiPoises at 40° C.

* * * * *